United States Patent
Colpaert et al.

(10) Patent No.: US 6,416,183 B1
(45) Date of Patent: Jul. 9, 2002

(54) APPARATUS AND METHOD FOR THREE-DIMENSIONAL MOVEMENT OF A PROJECTED MODULATED BEAM

(75) Inventors: Chris Colpaert, Lovendegem; Stefan Lesschaeve, Poperinge, both of (BE)

(73) Assignee: Barco N.V., Kortrijk (BE)

( * ) Notice: Subject to any disclaimer, the term of this patent is extended or adjusted under 35 U.S.C. 154(b) by 22 days.

(21) Appl. No.: 09/729,383

(22) Filed: Dec. 4, 2000

(51) Int. Cl.[7] .............................................. G03B 21/00
(52) U.S. Cl. ........................................ 353/46; 353/101
(58) Field of Search ............................ 353/46, 50, 51, 353/119, 98, 99, 101, 100; 434/44

(56) References Cited

U.S. PATENT DOCUMENTS

| | | | |
|---|---|---|---|
| 3,998,532 A | * 12/1976 | Dykes | 434/44 |
| 4,538,991 A | * 9/1985 | Simpson et al. | 434/44 |
| 4,735,499 A | * 4/1988 | Kiuchi | 353/119 |
| 5,033,842 A | * 7/1991 | Tam | 353/119 |
| 5,566,370 A | * 10/1996 | Young | 434/44 |
| 5,993,012 A | * 11/1999 | Buchanan et al. | 353/119 |
| 6,099,128 A | * 8/2000 | Jessl | 353/99 |

* cited by examiner

Primary Examiner—William Dowling
(74) Attorney, Agent, or Firm—Lee, Mann, Smith, McWilliams, Sweeney & Ohlson

(57) ABSTRACT

The present invention to provides a projection system for three-dimensional movement of projected modulated beam. It comprises a stationary light source, a projection lens, an optical path from the light source to the projection lens and a light beam modulating element in the optical path. The light modulating element moves with the projection lens. The image is generated at a location whereafter the modulated beam is not deflected anymore before arriving at the projection lens. Therefore there is no rotation of the modulated light beam around its own optical axis, independent of the direction of projection.

22 Claims, 2 Drawing Sheets

APPARATUS AND METHOD FOR THREE-DIMENSIONAL MOVEMENT OF A PROJECTED MODULATED BEAM

TECHNICAL FIELD OF THE INVENTION

The present invention relates to a device for the three-dimensional movement of a projected spatially light modulated beam, which can independently change the beam projection orientation in the azimuth and/or elevational direction without the projected modulated beam being rotated about its own optical axis if it is projected onto another location.

The projection devices of the present invention may be used for various illumination and lighting applications, in particular to obtain visual effects and for light pattern generation and as a gobo.

BACKGROUND OF THE INVENTION

Typically, projectors project video or still images onto a fixed projection surface, so that the projections are bound to certain image positions. These projectors are fixed e.g. on a ceiling such that the projected light beam is fixed with respect to the projection surface.

In show, advertising and simulation applications, in stage and theatre lighting, however, a three-dimensional movement of the projection beam is often desired.

Furthermore, in lighting, a spotlight may for example be placed on a person or on a detail in a scene. In order to obtain special effects, this spotlight is often focussed on a gobo, a small circular aperture with a pattern on it. Typically, multiple different gobo shapes (patterns) are obtained by placing the gobos into a cassette or the like which is rotated to select between the different gobos. The gobos themselves can also be rotated within the cassette.

Previously, gobos were passive devices. A digital gobo is described in U.S. Pat. No. 5,828,485. In a digital gobo, a light valve is used, which can change the pattern on the gobo on demand.

One application of stage lighting is projection of an image for shadowless lighting, or provision of a shadowless follow spot, which is lighting of a person where no shadow falls behind that person. This is done by determining the shape of the performer on stage, e.g. by infrared detection, and by identifying its borders. Those borders are used to define an outline that is slightly smaller than that of the performer. That outline is supplied to dynamically variable gobo for modulation of the projected light. As the performer continues to move, the changing border shape is followed and a new outline is defined which is fed to the means for producing a new outline spot, used as a new gobo for the light. In order to be able to follow the performer on stage, the projector must be able project the images in all directions.

One way to achieve the goal of projecting images all around, is putting a projector on a movable mount. For a high performance a heavy projector would be required and this would call for a substantial mount and powerful motors. It is preferred to use light-weight devices and to reduce the power consumption and operating noise level and to increase reaction speed, such as the speed of direction changes. Cable connections should be flexible and light in weight to reduce loads on stage support frames. Furthermore, such a moving device is not advisable for bright xenon lamps inside the projector, as the light-emitting arc can become unstable when subjected to rapid accelerations.

WO 98/18037 describes a method and device for the three-dimensional movement of the projection beam of a video or graphics projector. The projection beam, coming from a light source and guided over and/or through an opto-electronic image generator and through a projection lens, is deflected by means of at least one mirror to be swivelled about two axes, an X-axis extending in direction of incidence of the projection beam and a transversely extending Y-axis. The projector is thus fixed, only the mirror rotates. It is the diverging image beam coming out of the projection lens which is deflected. The rotation of the mirror generates a rotation of the projected image, which is compensated for by means of an additional rotation of the image carrier (e.g. the DMD mirrors) in a forced coupling with the swivel movement of the mirror. The construction of the device is rather complex.

U.S. Pat. No. 4,235,535 describes a projection apparatus for projecting images on a cylindrical screen for purposes of simulating the view from a ship and being included in a ship simulator. Light coming from an image producing device is sent through a duct towards a projection lens, a stationary mirror and a movable mirror. In the duct, a derotation prism such as a dove prism is provided to make sure that the image as projected in different directions is always upright. Such a derotation prism adds to the complexity of the beam deflection assembly and furthermore reduces image quality.

In U.S. Pat. No. 4,702,699 is described a target image representation system, used e.g. in a target acquisition training system. An image carrying beam coming from a projector is sent into an image deflection assembly comprising a support column and an image deflection head rotatable on the column about the vertical axis of the column. A first reflecting element redirects the image carrying beam into a vertical path along the axis of the column. A second reflecting element fixedly mounted in the deflection head then redirects it back into a horizontal path. A third reflecting element which is rotatably mounted in the deflection head for rotation about the axis of the image carrying beam directed thereto, redirects it again into a path at right angles to the horizontal path. The beam reflected from this third reflecting element passes through a window and projects the image on the screen. Rotation of the deflection head about the vertical axis of the column causes a change in the azimuth of the projected image, while the rotation of the reflecting element about the horizontal beam axis causes a change in the elevation of the image on the screen. Rotations of the reflecting elements in producing the desired azimuth and elevation of the target image give rise to rotations of the target image about the beam axis. This is solved according to U.S. Pat. No. 4,702,699 by including in the projection means an image generating means for generating target images which are to be projected by the beam and which are oriented to compensate for image rotation by the image beam deflection assembly.

There is also known from WO 94/08425 a light projecting apparatus for projection of visual information onto viewing surfaces. An optical system attached to the final output of a projector varies orientation relative to the projector on either single or multiple viewing surfaces. A tiltable and rotatable mirror is provided for moving the image, as well as an image rotator assembly in order to pre-rotate the image so that it is always projected upright. The image rotator assembly adds to the complexity of the system.

SUMMARY OF THE INVENTION

It is an object of the present invention to provide an improved projection system for three-dimensional movement of a projected spatially modulated light beam where the light generating projection lamp is not subject to high accelerations and therefore does not become unstable.

It is a further object of the present invention to provide an improved projection system for three-dimensional movement of a projected spatially modulated light beam where the projected beam is not rotated about the beam axis when projecting the beam towards different locations.

The above objectives may each be accomplished by a projection system for three-dimensional movement of a projected spatially modulated light beam comprising: a light source, a spatial light modulation unit for projecting a spatially modulated light beam and an optical path from the light source to the spatial light modulation unit. The spatial light modulation unit may include a spatial light modulator and a projection lens. The spatial light modulator may be a light shaping device, especially a digital light shaping device or an image forming device, especially a digital image forming device. The spatial light modulator generates a spatially modulated light beam, either monochromatic, e.g. white, or coloured, when light falls in on it from a non-image modulated light beam from the light source. The spatial light modulator is moved with the projection lens as a combined unit by a driving mechanism. As the spatial modulated light beam is generated at such a location that the spatially modulated light beam is not deflected anymore before arriving at the projection lens, there is no rotation of the shaped light or image beam around the axis of the beam, whatever the direction of projection, i.e. independent of the direction of projection. The spatial light modulator may be any suitable modulator such as a light valve, a transmission LCD light valve, a reflection LCD light valve, a DMD or similar.

The present invention also includes a method of projecting a spatially modulated light beam which is non-rotating with respect to its own optical axis when the beam is projected in differing directions, comprising the steps of:
   a) generating a spatially unmodulated light beam from a light source;
   b) projecting the light beam towards a spatial light modulation unit along a light path;
   c) forming a spatially modulated beam from the light beam using the spatial light modulator unit;
   d) projecting the modulated beam; and
   e) moving the projected beam through space by rotating the spatial light modulator unit with respect to the light source. The method may comprise rotating the spatial light modulation unit about two orthogonal axes of rotation. Each axis of rotation may locally coincide with an optical axis of the light path.

These and other features and advantages of the present invention will become apparent from the following detailed description, taken in conjunction with the accompanying drawings, which illustrate, by way of example, the principles of the invention.

DESCRIPTION OF THE PREFERRED EMBODIMENTS

The present invention will be described with reference to certain embodiments and drawings but the present invention is not limited thereto but only by the claims.

Figure 1:
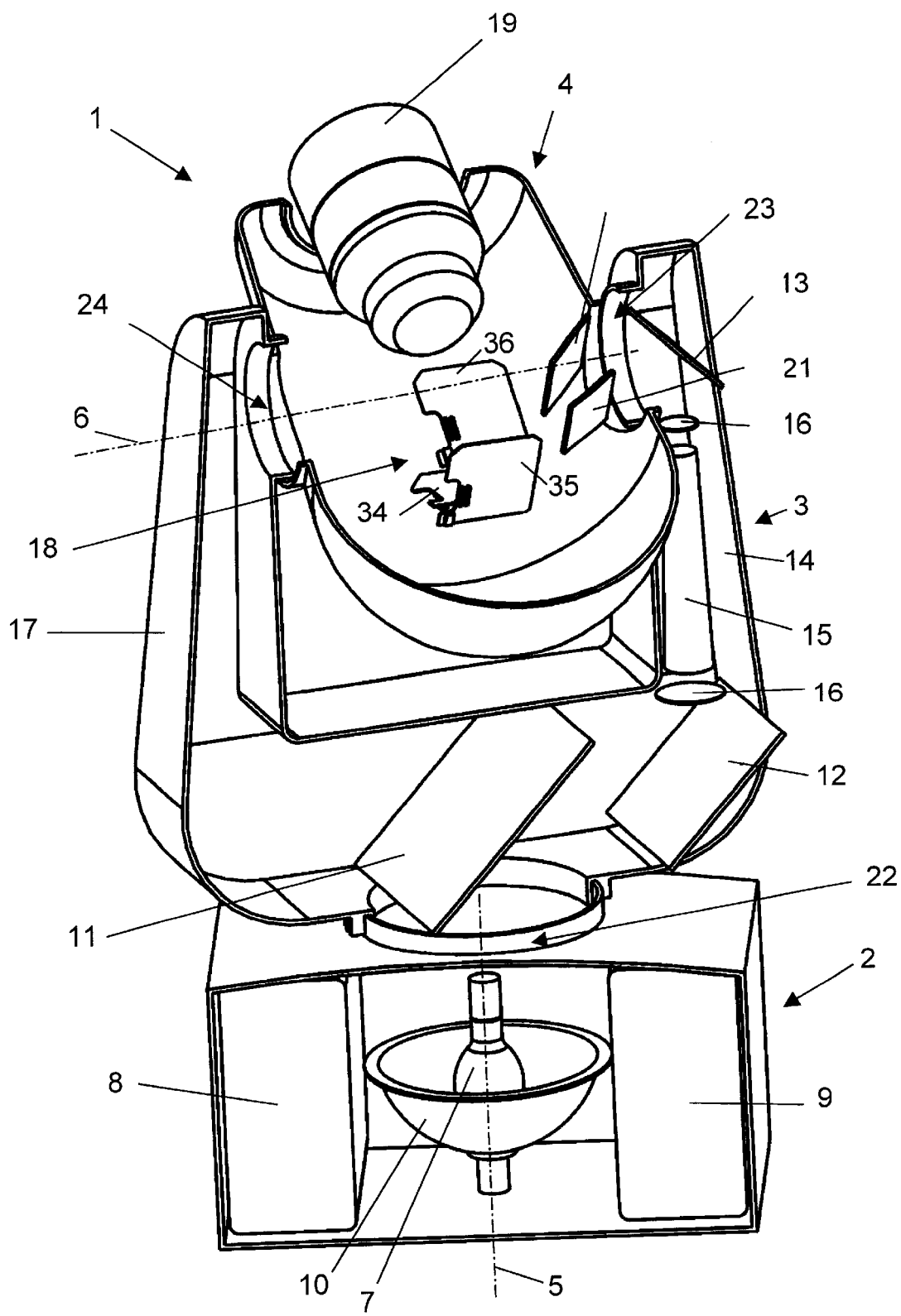
FIG. 1 is a diagrammatic cross-sectional elevational view of an embodiment of a projection system according to the present invention.

The projection system 1 of FIG. 1 according to an embodiment of the present invention comprises three constituent parts: a base member 2, a cradle element 3 and a spatially modulated light beam generating housing 4. These three constituent parts are rotatably assembled such that there are two mutually orthogonal axes of rotation. The cradle element 3 is rotatably mounted with respect to the base member 2 around a first axis of rotation 5 which passes through the centre of the cradle element parallel to the extending direction of the arms 14, 17 of the cradle element, and the spatially modulated light beam generating housing 4 is rotatably mounted with respect to the cradle element 3 around a second axis of rotation 6. The first and second axes of rotation are orthogonal to each other. By selection of the angular displacement within these two degrees of freedom, a spatially modulated beam such as a shaped light beam, e.g. as from a gobo, or an image modulated beam, e.g. as from a video, can be projected in any desired direction and may also be swept through any angle or along any trajectory provided the light beam is not blocked by the base member 2.

The base member 2 may be fixed to a wall, a ceiling, or another point of suspension such as a stage lighting supporting frame. It comprises the heaviest parts of the complete system, such as a lamp 7, for example a xenon lamp, a power supply and power cable connecting unit 9, and an electronic control unit and signal cable connecting unit 8. This base member 2, together with the heavy parts, remains in a fixed, stationary position.

A light beam generated by the lamp 7 may be directed upwards by a reflector 10, e.g. a parabolic reflector around the lamp 7, into the cradle element 3 which is normally enclosed (shown open in FIG. 1 to display the elements within).

A set of mirrors 11, 12, 13, guide the light through a first arm 14 of the cradle element 3. Preferably the second mirror 12 is a cold mirror, which reflects the visible light, but transmits the infrared light onto a heat sink (not represented). That way, less cooling will be needed in the spatially modulated light beam generating housing 4.

The first arm 14 of the cradle element 3 can also house a rectangular or cylindrical light pipe 15 and one or more relay lenses 16, optic elements used to efficiently transfer a light beam from one point to another in an optical system, in order to adequately provide light to a spatial light modulation unit 18, 19 in the spatially modulated light beam generating housing 4.

The second arm 17 of the cradle element 3 may house a part of the electronic control system (not represented). In particular, a formatter board can be housed here, as close as possible to a spatial light modulator element 18 if this is a DMD. Alternatively an LCD driver panel can be housed in the second arm 17 of the cradle element 3, if the element 18 is an LCD.

Preferably the weights of the two arms of the cradle element 3 are equal, so as to have a smooth movement when the cradle element 3 is rotated with respect to the base member 2 around the first axis of rotation 5.

The spatially modulated light beam generating housing 4 houses the spatial light modulator element 18, such as a light valve element 18, and a projection lens 19. The light beam coming from the first arm 14 of the cradle element 3, which at this point is preferably not modulated with an image, enters the spatially modulated light beam generating housing 4 through the centre of the axis 6 of rotation of the housing 4 about the arms 14 and 17. The light beam falls on the light valve element 18 where the image or shaped light beam is formed from the incident light beam to produce a spatially modulated light beam. The modulated beam is sent to the projection lens 19 preferably without further reflection from which the modulated beam is projected. When the housing 4 is in the neutral position in which the direction of projection represented by the central axis of the projection lens 19 is parallel with the arms 14, 17, the central axis of the projection lens 19 preferably coincides with the axis 5 so that rotation of cradle element 3 about axis 5 causes pure rotation of the projected modulated beam.

Through an opening between the second arm 17 of the cradle element 3 and the spatially modulated light beam generating housing 4, cables for signal and power go to the light valve element 18.

The light valve element 18 can use any known technology, such as e.g. a Digital Light Processor (DLP), a Digital Micromirror Device (DMD), e.g. as known from U.S. Pat. No. 5,061,049, a Liquid Crystal Device (LCD), a Liquid Crystal On Silicon (LCOS, reflective LCD's). In FIG. 1 a DMD light valve 18 is schematically pictured. This kind of light valve element receives the light at an angle of approximately 20°. Two mirrors 20, 21 can be used before the light valve element 18 to provide for this. Preferably, the incident light beam is a white, preferably cold light beam and this light beam is split into at least three colours e.g. red, blue and green. These separate coloured beams are modulated by respective light valves and the three or more images superimposed upon each other in a suitable mixing device such as a prism and projected as a full colour or monochromatic modulated light beam. The spatial light modulator 18 is preferably a digital device which can receive a representation of a digital image or shape and can impress this image or shape on the incident light beam. Preferably, the shape or image may be changed at will, either by signals which are transmitted to the projection systems by cable or wirelessly, or from pre-stored signals in a memory in the control unit.

Figure 2:
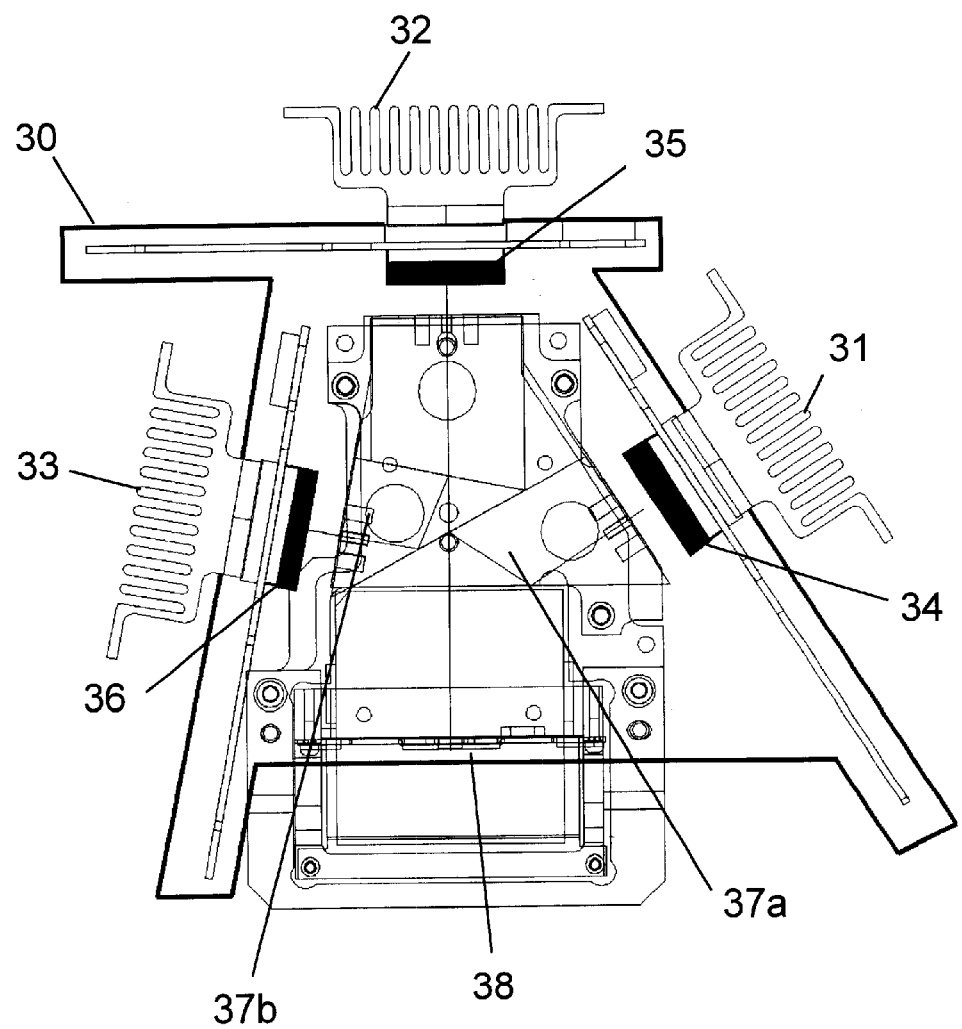
FIG. 2 is a cross-sectional view of a substantially sealed chamber enclosing a DMD in a projection system according to an embodiment of the present invention.

According to a preferred embodiment of the present invention, at least a portion of the light valve element 18 may be enclosed in a substantially sealed chamber 30, as described in co-pending European Patent Application EP 00203260.5 (herein incorporated by reference) as represented in FIG. 2, in order to prevent dust and other foreign matter, such as smoke or oil, from penetrating to the spatial light modulation element 18 when air is introduced from outside the projection system 1 into the beam generating housing 4 to cool the modulated beam generating element 18. An air filter is generally placed over the intake opening to capture dust and filter the air, but it is still possible for fine particles to penetrate to the inside of the apparatus. When such particles enter the inside of the generating housing 4 with the outside air, they may adhere to the surface of the optical elements of the modulated beam generating element 18. When particulate matter thus adheres to an LCD, it causes decreased light output. When it adheres to a DMD, it may hinder the light output and the uniformity of colour. With "substantially sealed" is meant that the chamber 30 is sealed from the ambient space so that no dust particles can enter the substantially sealed internal space, but there is no meant difference in pressure between the internal space of the sealed chamber 30 and the ambient space. The substantially sealed chamber 30 is an atmospheric system, it is not pressure sealed.

The beam modulating element may comprise three DMD's 34 to 36 as well as a set of colour splitting/colour combining prisms 37a and 37b which split the incident white light into three suitable coloured beams (e.g. red, blue, green), direct these beams to three DMD's 34–36, combine the three reflected beams from the DMD's 34–36 and project them through a window 38 towards the projection lens. A uniform temperature of the beam modulating element 18 inside the sealed chamber 30 is desirable in order to have a good image quality. A circulating air current may therefore be created by force, by means of a circulation fan (not represented), inside this substantially sealed chamber 30, for cooling the heat-emitting components of the modulated beam generating element 18. Preferably means (not represented) are furthermore provided for introducing outside air into the generating housing 4 and for directing the outside air around the outside surface of the walls enclosing the substantially sealed chamber 30. A heat exchange action between the circulating air current created inside the substantially sealed internal space and the outside air flowing around the substantially sealed chamber 30 is thereby accomplished. Heat sinks 31, 32, 33 may also be provided on the DMDs 34, 35, 36 for cooling these. The heat sinks may be cooled by circulated fluid such as a liquid or a gas, or by active devices such as a Peltier element or a heat pipe.

By rotating the cradle element 3 of the projection system 1 with respect to the base member 2 about axis 5 and by rotating the modulated beam generating housing 4 with respect to the cradle element 3 about axis 6, the shaped or imaged light beam may be projected in any direction. As the modulated beam forming element 18 and the projection lens 19 are both located in the beam generating housing 4, stationary with respect to each other, the projected modulated beam is not rotated around the axis of the projected modulated light beam when moving the beam generating housing 4. Movement may be provided by suitable motors; e.g. ring motors located in an opening 22 in the base element 2, and ring motors provided in opening 23 and 24 in the arms 14 and 17, respectively. By using ring motors light beams may pass through the centre of the motor along the axis thereof. The motors may be stepper motors or DC-servomotors so that the exact angle of the cradle 3 and the housing 4 can be controlled as is known to the skilled person from the design of robots. Each axis of rotation 5, 6 coincides with a local optical axis. This ensures that the design of the projection system 1 is simple and elegant, and free of individually moving mirrors.

While the invention has been shown and described with reference to preferred embodiments, it will be understood by those skilled in the art that various changes or modifications in form and detail may be made without departing from the scope and spirit of this invention. For instance, filters and other special effect devices may be optionally and selectably moveable into the light path for projection, such as coloured filter wheels, lithos such as litho pattern wheels, an iris, different projection lenses, beam shapers, effect wheels such as variable frost, twinkle wheels, or predefined lettering or messages. The projection lens may support remote focussing and/or remote zooming. A plurality of projection lenses may be mounted in a turret which can be rotated to bring one of the plurality of projection lenses in front of the input of the spatial light modulator 18. Strobe lighting devices may also be included. As the lamp is in the stationary base member 2, a sophisticated lamp control unit may be provided, e.g. allowing energy saving features, to provide strobe effects, to replace one lamp with an additional lamp automatically if one lamp breaks. Also multiple spatial light modulators and multiple projection lenses may be provided in housing 4.

What is claimed is:

1. A projection system for three-dimensional movement of a projected modulated light beam, comprising a light source, a projection lens, an optical path from the light source to the projection lens and a spatial light modulating element in the optical path, and a drive mechanism for moving the spatial light modulating element and the projection lens as one unit with respect to the light source.

2. A projection system according to claim 1, wherein the projection system has two orthogonal axes of rotation.

3. A projection system according to claim 2, wherein each axis of rotation locally coincides with an optical axis of the optical path.

4. A projection system according to claim 1, wherein the spatial light modulating element is an image forming element.

5. A projection system according to claim 1, wherein the spatial light modulating element is a light beam shaping element.

6. A projection system according to claim 1, wherein the spatial light modulating element is a digital spatial light modulating element.

7. A projection system according to claim 1, wherein the spatial light modulating element is a light valve element.

8. A projection system according to claim 1, wherein the spatial light modulating element is selected from one of a DMD, an LCD, an LCOS, a DLP.

9. A projection system according to claim 1, wherein at least a portion of the spatial light modulating element is enclosed in a substantially airtight space.

10. A projection system according to claim 9, wherein a cooling device is provided for the spatial light modulating element inside the substantially airtight space.

11. A method of projecting a modulated light beam which is non-rotating with respect to its own optical axis as the beam is directed towards different directions within a three-dimensional space, comprising the steps of:

a) generating an unmodulated light beam at a light source;

b) projecting the light beam towards a spatial light modulating unit along a light path;

c) forming a modulated beam from the unmodulated light beam using the spatial light modulating unit;

d) projecting the modulated beam; and e) moving the projected beam through space by rotating the spatial light modulating unit with respect to the light source.

12. A method according to claim 11, wherein the moving step comprises rotating the spatial light modulating unit about two orthogonal axes of rotation relative to the light source.

13. A method according to claim 12, wherein each axis of rotation locally coincides with an optical axis of the optical path.

14. The method according to claim 11, wherein the forming step comprises one of light beam shaping and image forming.

15. A projection system for three-dimensional movement of a projected modulated light beam through a three-dimensional space, comprising a light source, a spatial light modulating unit and an optical path from the light source to the spatial light modulating unit, and a drive mechanism for moving the spatial light modulating unit and the projection lens as one combined unit with respect to the light source to move the projected modulated light beam through the space.

16. A projection system according to claim 15, wherein the projection system has two orthogonal axes of rotation.

17. A projection system according to claim 16, wherein each axis of rotation locally coincides with an optical axis of the optical path.

18. A projection system according to claim 15, wherein the spatial light modulating unit comprises an image forming element.

19. A projection system according to claim 15, wherein the spatial light modulating unit comprises a light beam shaping element.

20. A projection system according to claim 15, wherein the spatial light modulating unit is a digital spatial light modulating unit.

21. A projection system according to claim 15, wherein the spatial light modulating unit comprises a light valve element.

22. A projection system according to claim 15, wherein the spatial light modulating comprises a spatial light modulating element selected from one of a DMD, an LCD, an LCOS, a DLP.

* * * * *